April 2, 1968 W. I. NISSEN 3,375,578
SAFETY RAZORS
Filed Aug. 7, 1967 7 Sheets-Sheet 1
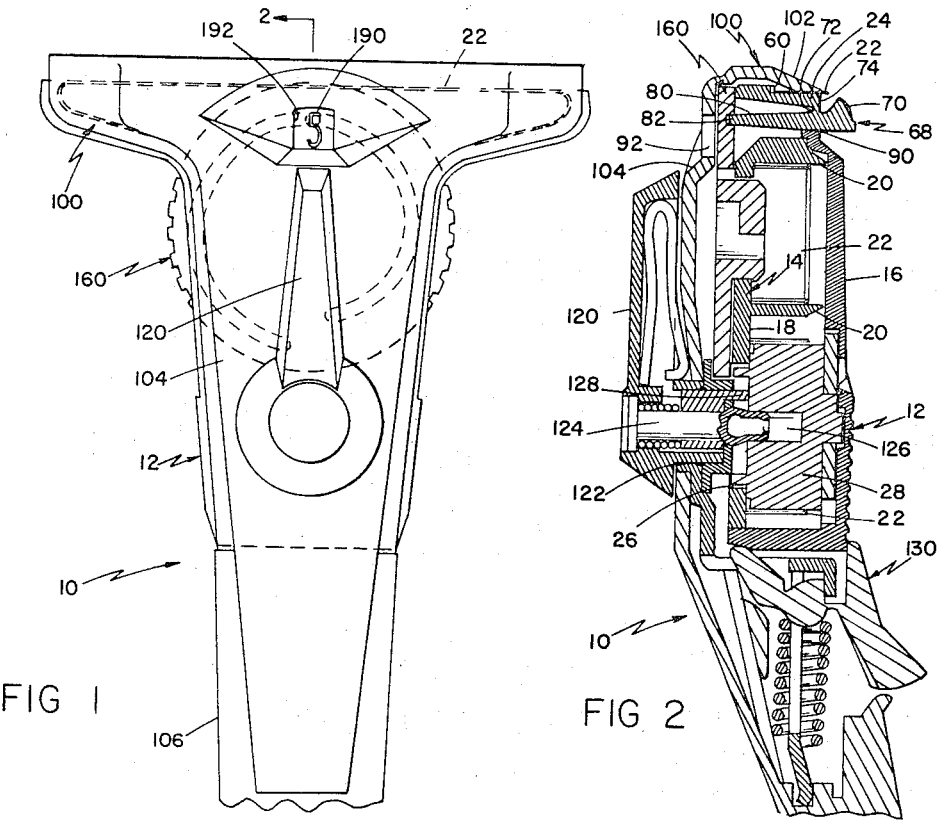
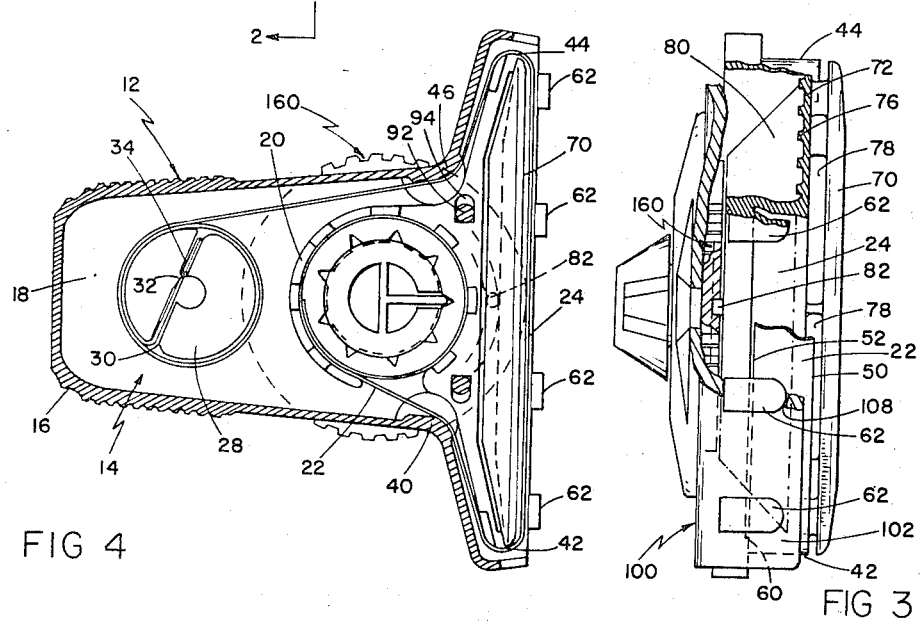

April 2, 1968 W. I. NISSEN 3,375,578
SAFETY RAZORS
Filed Aug. 7, 1967 7 Sheets-Sheet 2
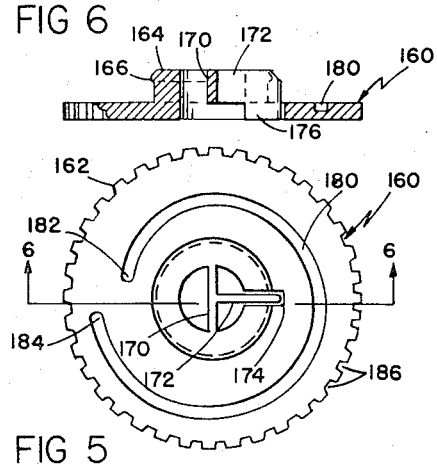
FIG 6
FIG 5
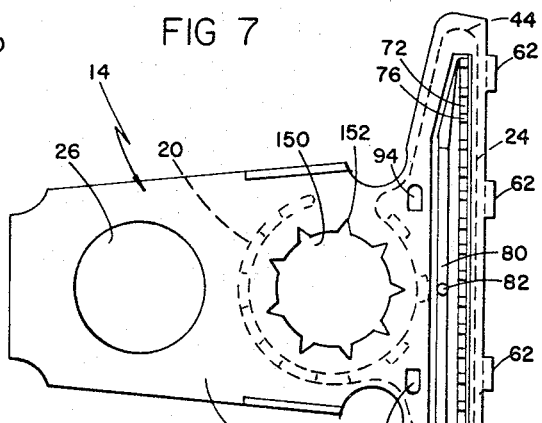
FIG 7
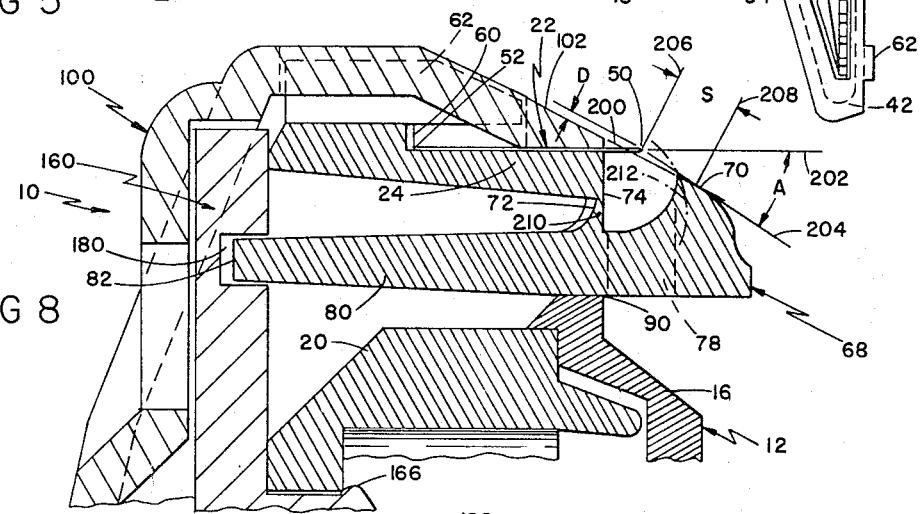
FIG 8
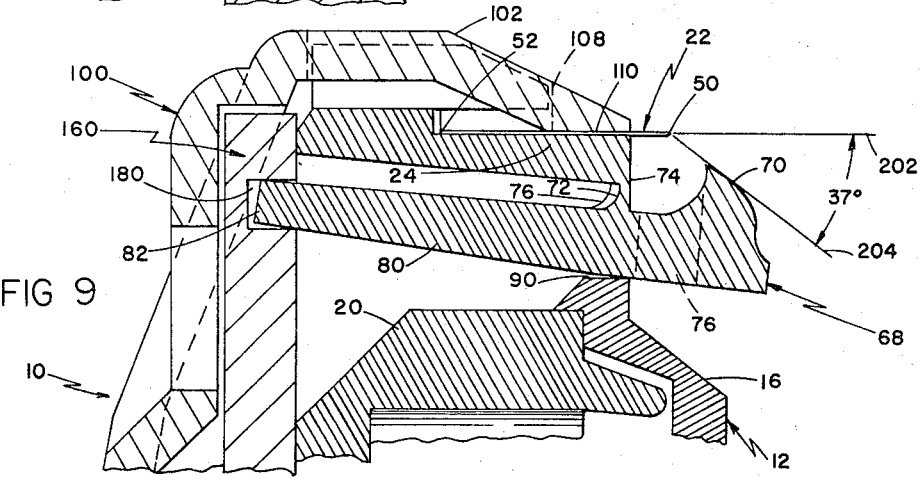
FIG 9

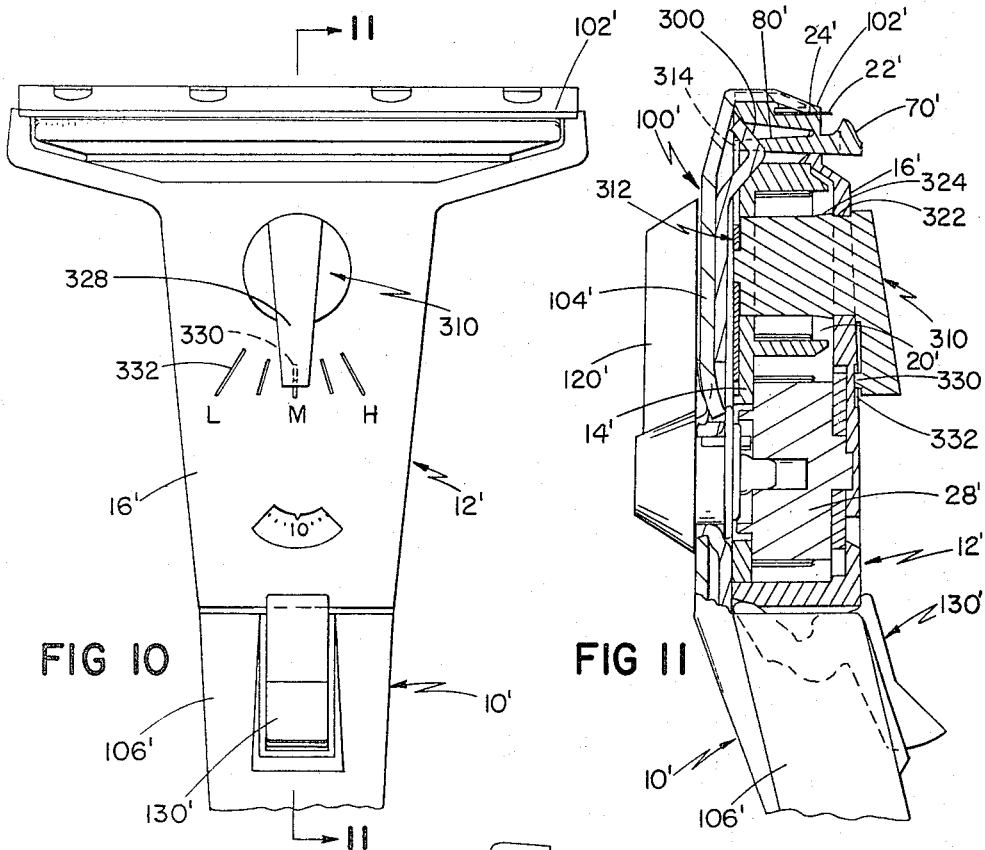
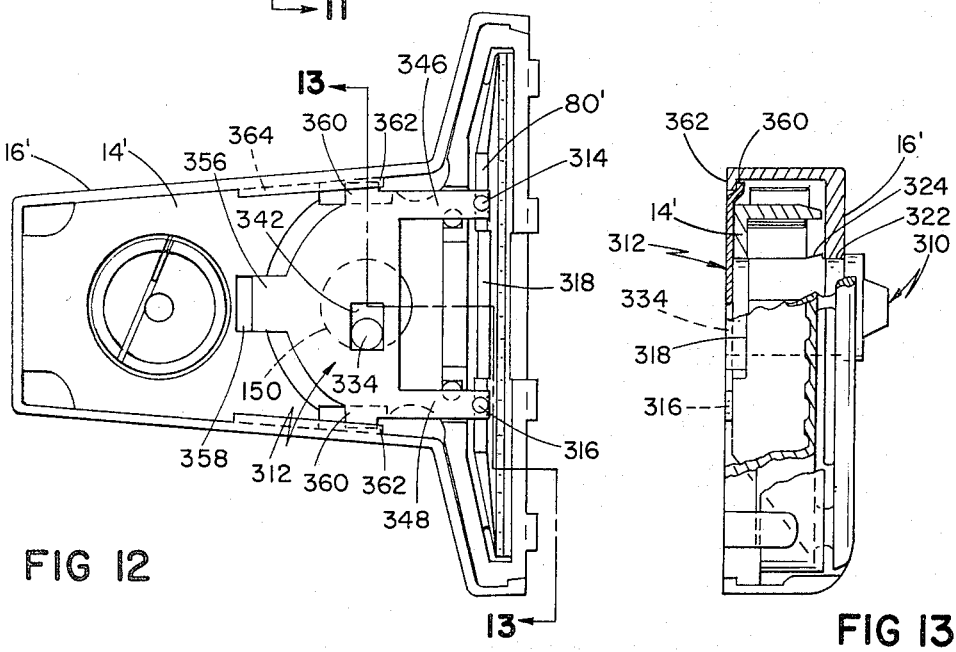

April 2, 1968  W. I. NISSEN  3,375,578

SAFETY RAZORS

Filed Aug. 7, 1967  7 Sheets-Sheet 4

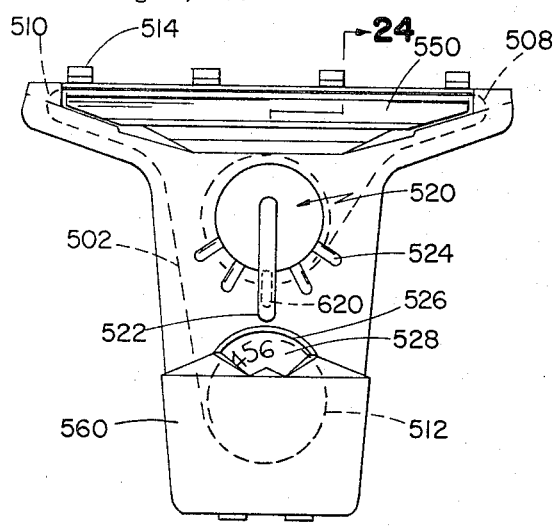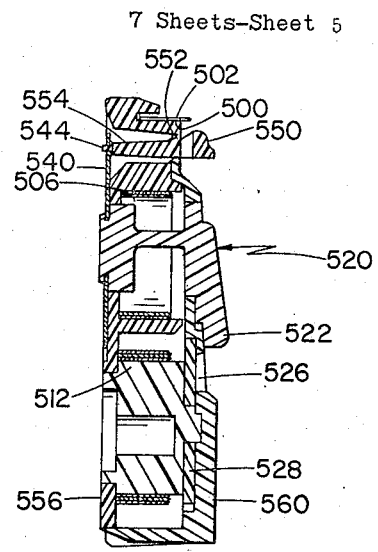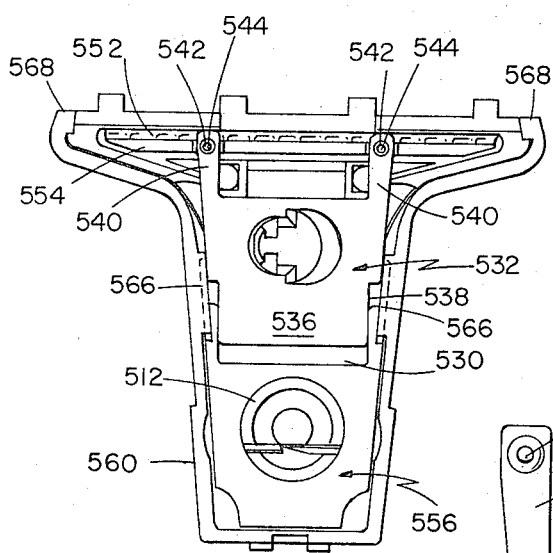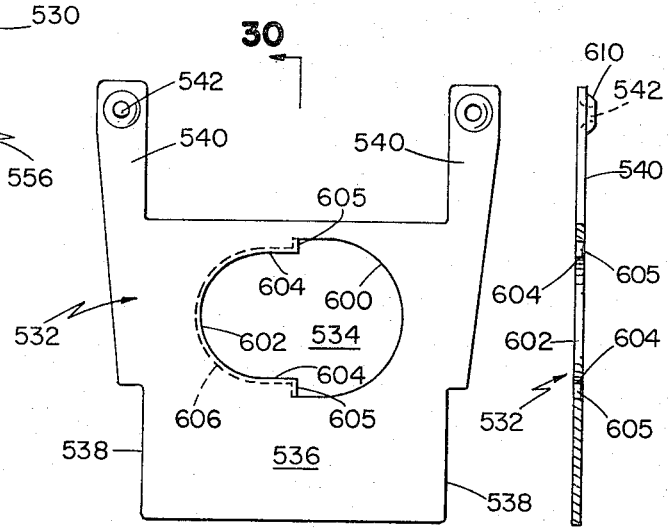
FIG 22  FIG 24  FIG 23  FIG 29  FIG 30

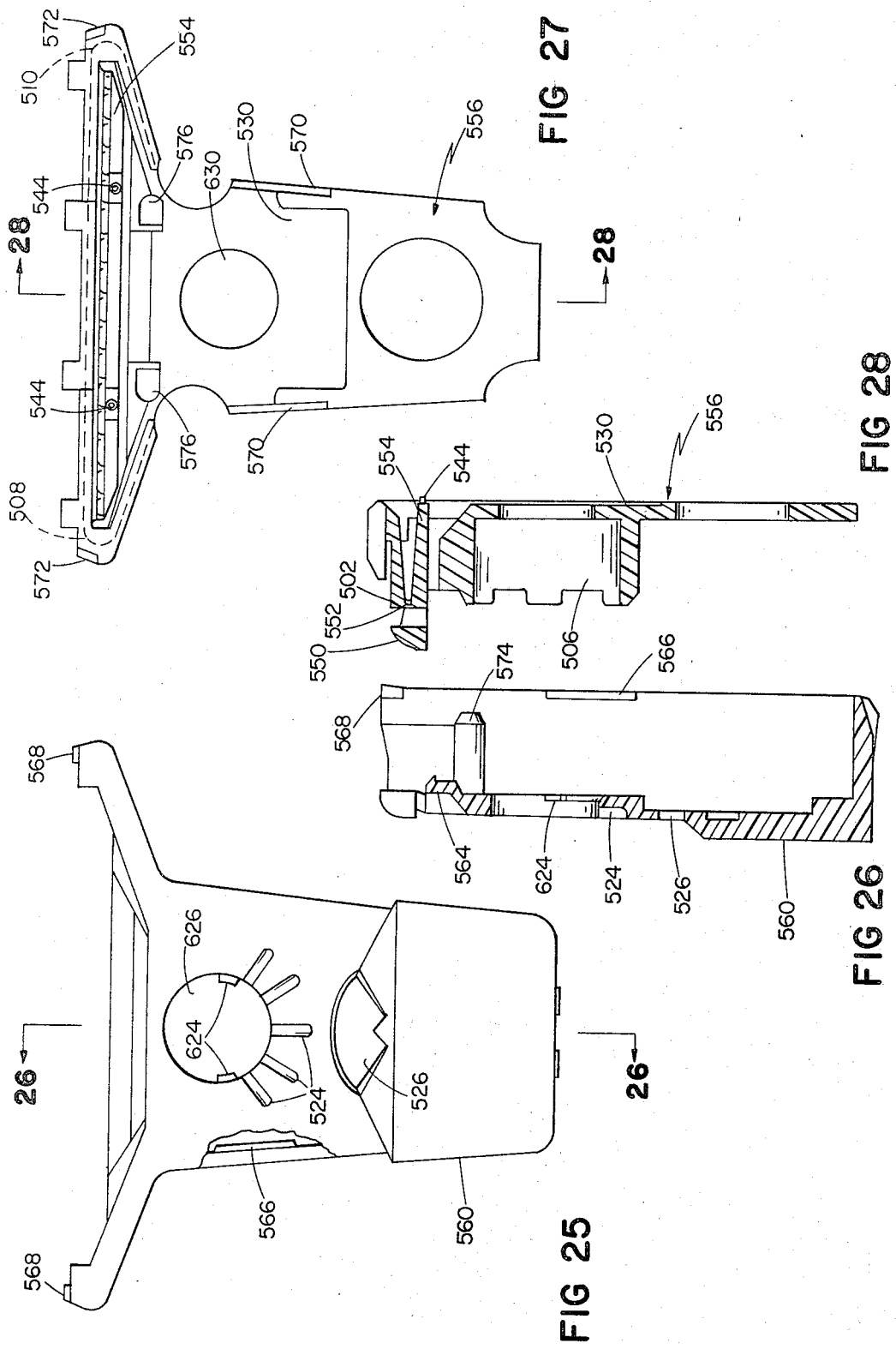

April 2, 1968  W. I. NISSEN  3,375,578
SAFETY RAZORS
Filed Aug. 7, 1967  7 Sheets-Sheet 7
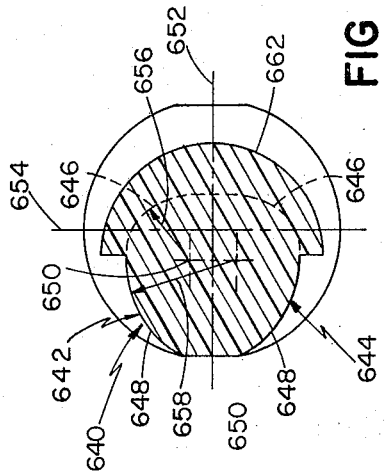
FIG 34
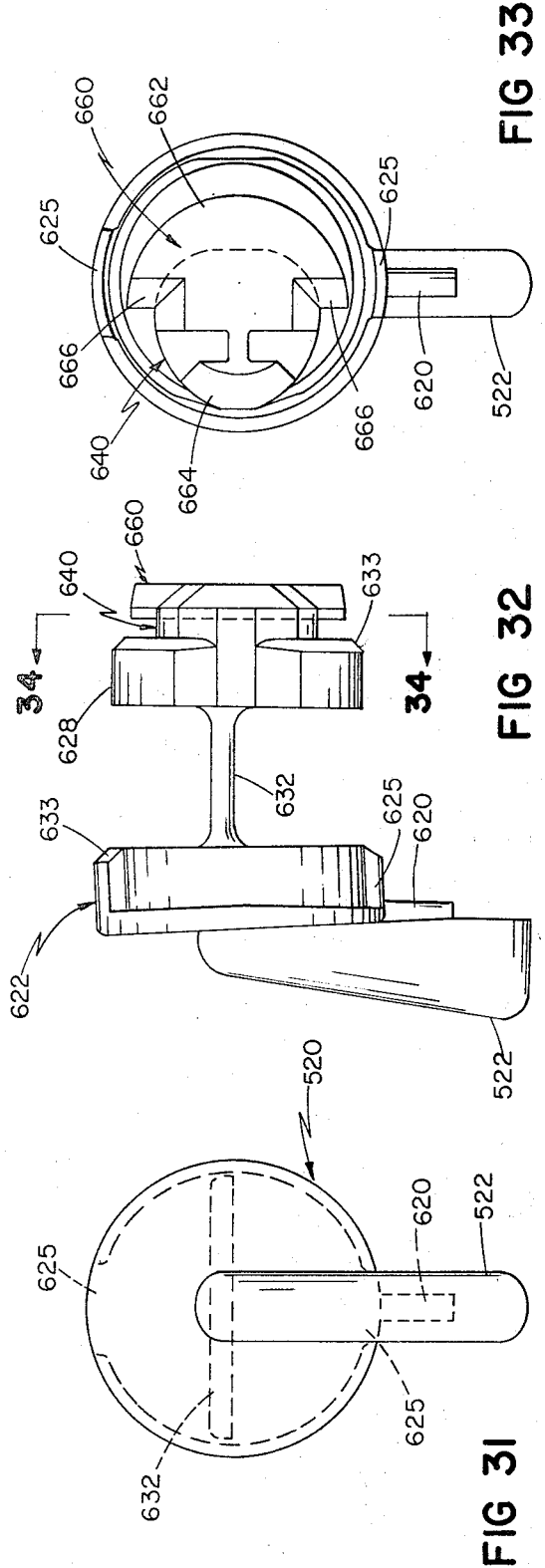
FIG 33
FIG 32
FIG 31

United States Patent Office 3,375,578
Patented Apr. 2, 1968

3,375,578
SAFETY RAZORS
Warren I. Nissen, Topsfield, Mass., assignor to The Gillette Company, Boston, Mass., a corporation of Delaware
Continuation-in-part of applications Ser. No. 579,335, Sept. 14, 1966, and Ser. No. 618,581, Feb. 27, 1967. This application Aug. 7, 1967, Ser. No. 658,742
29 Claims. (Cl. 30—40.1)

ABSTRACT OF THE DISCLOSURE

A shaving geometry adjustment arrangement for a razor blade cartridge containing a continuous band of ribbon like blade includes a shaving platform on which the blade is supported in the shaving zone and a guard bar that is molded integral with the shaving platform and secured to that platform by a flexible hinge element. This hinge is an imperforate web 0.005 inch in depth which is reinforced with rib elements, each of which has a depth of 0.015 inch and a width of 0.030 inch, and which are spaced 0.060 inch apart. An adjusting lever is molded integral with the web and extends rearwardly to engage an adjusting device. The adjusting device in one embodiment is a disc having a spiral camming groove formed in it, and in other embodiments is a guide plate camming lever arrangement. In one of those arrangements the guide plate has two cam follower surfaces spaced 0.203 inch apart which cooperate with a camming surface or the camming lever which is composed of two identical sets of arcuate segments, one segment having a radius of 0.077 inch and the other segment having a radius of 0.123 inch. This camming lever also has a latching surface which secures the guide plate to the cartridge assembly and provides a securing function for other components of the cartridge assembly.

Summary of invention

This application is a continuation in part of my copending patent applications Ser. No. 579,335, filed Sept. 14, 1966 and entitled Safety Razors and Ser. No. 618,581, filed Feb. 27, 1967 and entitled Safety Razors, both abandoned.

This invention relates to safety razors and more particularly to arrangements for adjusting the shaving geometry of such razors.

It is frequently desirable to provide a construction in a safety razor which enables the user to adjust the shaving geometry (the relationship between the sharpened edge of the razor blade as exposed in the blade holder with respect to the shaving guard and/or the clamping cap) to suit his individual preferences and/or shaving requirements and it is an object to provide a novel and improved razor structure which enables adjustment of shaving geometry simply and reliably. This invention has particular applicability to safety razors of the type shown in the Nissen Patent No. 3,262,198, that is, a razor provided with a removable cartridge or magazine containing a continuous band of ribbon-like blade in an arrangement in which successive lengths of the blade may be sequentially advanced into shaving position by the user. The magazine for such a razor should be a compact storage compartment which presents a relatively long length of blade edge in a shaving zone and includes a relatively abrupt transition at at least one end of the shaving zone in order to expedite shaving. In such a razor, a guard structure positioned generally in front of and extending parallel to and spaced from the blade support platform limits the exposure of the sharpened edge of the blade, and it is a further object of the invention to provide an arrangement for adjusting the shaving geometry provided by such a holder-magazine construction so that a wide range of preferences of the user with respect to shaving geometry may be accommodated. A number of unique problems arise in connection with a ribbon type razor construction, however. For example, as the major components that affect shaving geometry are part of the replaceable component—the magazine—the production cost of the adjustable feature to the extent that it is incorporated in the replaceable component must be minimized in order to be economically competitive. The adjustment should be easy to make and permit a wide range of shaving geometries while not creating any potentially hazardous condition for the user. Accordingly, it is another object of this invention to provide a novel and improved ribbon-type razor blade magazine structure which provides adjustable and yet precise shaving geometry configuration.

Another object of the invention is to provide a novel and improved razor adjustment arrangement which enables the shaving geometry to be adjusted with accuracy, certainty and effectiveness.

Another object of the invention is to provide a compact shaving geometry adjustment arrangement for use in safety razors.

A further object of the invention is to provide novel and improved shaving geometry adjustment arrangements that are adaptable to high volume production techniques, both in the manufacturing of the components and in the assembly of the components into a unit.

Still another object of the invention is to provide a novel and improved shaving geometry adjustment arrangement that may be incorporated in the magazine itself, which magazine is compatible with conventional types of magazine holders.

A further object of the invention is to provide a novel and improved cartridge assembly for use in a ribbon type safety razor.

Still another object of the invention is to provide a novel and improved arrangement for securing together components of a cartridge useful in a ribbon type safety razor.

In accordance with the invention there is provided a shaving geometry adjustment arrangement for use in a razor construction that includes a blade support platform which defines a shaving zone for receiving and supporting a shaving length of blade in shaving position. The arrangement further includes a blade guard structure that extends in generally parallel spaced relation to and has a guard surface that is disposed forwardly of the blade support platform. The guard structure further includes an adjusting portion which is disposed beneath the blade platform and extends away from the guard surface. This guard structure is mounted for movement relative to the blade support platform about a hinge axis that is located below the support platform and that extends substantially parallel to the guard bar surface so that the shaving geometry of the razor may be adjusted.

In preferred embodiments of the invention the axis about which the guard structure is mounted for movement is defined by a flexible hinge element that is formed integrally with a magazine component. It is preferred that this flexible hinge element be a continuous web element that secures the guard structure to the blade support platform. The structure further includes a series of spaced reinforcing ribs on the web which act to maintain the geometry of the hinge-guard-shaving platform through the permitted range of adjustment. A cooperating adjusting element engages the adjusting portion for moving that portion and as a result the guard, relative to the blade support platfrom about the defined axis so that the shaving geometry of the razor is readily adjusted.

In specific embodiments the invention is incorporated in a razor construction that includes structure defining a blade support platform which defines a shaving zone for receiving and supporting a shaving length of blade in shaving position. The structure further includes a blade guard structure that extends in generally parallel, spaced relation to and is disposed forwardly and downwardly of the blade support platform and an integral adjusting lever which extends rearwardly beneath the blade platform for engagement with an adjusting mechanism mounted on either the holder member or the magazine (cartridge) member. The adjusting mechanism may take a number of forms.

In a particular embodiment, the adjusting mechanism includes an adjusting lever having a handle portion on the front of the cartridge which is connected to a camming surface that engages a slide plate disposed on the rear of the cartridge. This slide plate is connected to the guard structure adjusting portion and is guided for vertical movement so that the shaving geometry of the razor may be adjusted by rotation of the guard structure about the flexible hinge axis. A feature of this particular embodiment is the interengagement of the actuating member and the slide plate such that the components of the magazine are locked securely together in a manner which may be easily performed by automated production apparatus and which renders the disassembly of the cartridge components difficult.

Safety razor structures constructed in accordance with the invention incorporate an arrangement for adjusting components of the razor structure over a wide range of shaving geometry values in an arrangement which is compact, easy to operate with precision and certainty, relatively inexpensive to manufacture and compatible for manufacture with high volume production techniques and is particularly advantageous in a safety razor construction that uses an elongated ribbon-like blade element.

Other objects, features and advantages of the invention will be seen as the following description of particular embodiments thereof progresses, in conjunction with the drawings, in which:

FIG. 1 is a rear elevational view of a safety razor of the holder and magazine (cartridge) type constructed in accordance with the invention;

FIG. 2 is a sectional view of the safety razor shown in FIG. 1, taken along the line 2—2 of FIG. 1;

FIG. 3 is a top view of the safety razor structure shown in FIG. 1 with parts thereof broken away;

FIG. 4 is a front elevational view of the magazine structure employed in the safety razor shown in FIG. 1 with the front wall of the cover broken away;

FIG. 5 is an elevational view of the camming element employed in the magazine structure shown in FIG. 4;

FIG. 6 is a sectional view of that camming structure, taken along the line 6—6 of FIG. 5;

FIG. 7 is a rear elevational view of the back member of the magazine;

FIGS. 8 and 9 are two enlarged views showing the shaving geometry configuration of the safety razor structure shown in FIG. 1 in two different positions as controlled by the adjustment arrangement;

FIG. 10 is a front elevational view of a second form of safety razor of the holder and magazine (cartridge) type constructed in accordance with the invention;

FIG. 11 is a sectional view of the safety razor shown in FIG. 10, taken along the line 11—11 of FIG. 10;

FIG. 12 is a rear elevational view of the magazine shown in FIGS. 10 and 11;

FIG. 13 is a top view (in partial section taken along the line 13—13 of FIG. 12) of the magazine shown in FIGS. 10–12;

FIG. 22 is a front elevational view of still another form of safety razor cartridge constructed in accordance with the invention;

FIG. 23 is a rear view of the safety razor cartridge shown in FIG. 22;

FIG. 24 is a sectional view taken along the line 24—24 of FIG. 22;

FIG. 25 is a front view of the cover component of the cartridge;

FIG. 26 is a sectional view taken along the line 26—26 of FIG. 25;

FIG. 27 is a rear view of the back component of the cartridge shown in FIG. 22;

FIG. 28 is a sectional view taken along the line 28—28 of FIG. 27;

FIG. 29 is a view of the slide plate employed in the cartridge shown in FIG. 22;

FIG. 30 is a sectional view of the slide plate shown taken along the line 30—30 of FIG. 29;

FIG. 31 is a front view of the adjusting lever employed in the cartridge shown in FIG. 22;

FIG. 32 is a side view of the adjusting lever shown in FIG. 31;

FIG. 33 is a rear view of the adjusting lever shown in FIG. 31; and

FIG. 34 is a sectional view taken along the line 34—34 of FIG. 32.

*Description of particular embodiments*

Figure 14:
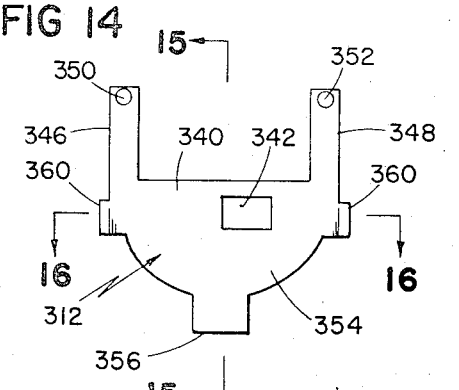
FIGS. 14–16 are rear, side and top sectional views, respectively, of the follower plate employed in the magazine shown in FIGS. 10–12.

With reference to FIGS. 1–3 the safety razor structure there illustrated includes a holder member 10 in which a magazine member 12 is releasably secured. This razor structure is generally of the type shown in the Nissen Patent No. 3,262,198 issued July 26, 1966.

The magazine member 12 includes a back element 14 and a cover element 16 which is secured to the back element by snap type connectors. It is preferred that the components of the magazine structure be manufactured of a moldable organic plastic capable of being subjected to repeated deformation stresses. A suitable plastic material for the back member 14 is an acetyl plastic sold under the name Celcon and a suitable plastic material for the cover member 16 is an acetyl plastic sold under the name Delrin.

With reference to FIG. 4 the back element 14 includes a generally planar base 18 having an upstanding cylindrical wall member 20 located intermediate the ends of the base. This cylindrical wall 20 defines a cylindrical supply chamber which receives a coil of shaving blade 22. Adjacent one end of the base 18 is formed an upstanding planar blade support platform 24 having a blade support surface that extends generally perpendicular to the plane of the base 18. Adjacent the other end of the base is a circular aperture 26 in which is rotatably disposed an arbor 28 that has a slot 30 therein that receives one end of blade 22. A portion of reduced width at point 32 in slot 30 engages a tab 34 secured to the end of blade 22 so that the end of the blade is firmly secured to the arbor 28.

Blade 22 extends from the supply chamber defined by cylindrical wall 20 past a first guide surface 40 formed in the magazine cover 16, a second guide surface 42 formed at the end of the blade support platform 24, along the blade support platform to a third guide surface 44 formed at the other end of the platform, then to a fourth guide surface 46 formed in the cover and finally to the take-up arbor 28. The blade element 22 in this embodiment is a strip of stainless steel 0.0015 inch in thickness and 0.1895 inch in width having a sharpened forward edge 50 and an unsharpened rear edge 52 (as best indicated in FIGS. 8 and 9).

Formed at the rear end of the blade support platform 24 at each end thereof is a vertical pad surface 60 which provides a guide for the rear edge 52 of the ribbon blade 22. Disposed above the blade support platform 24 and extending forwardly over that platform are a series of four spaced tabs 62 which act as guides contributing to the definition of the path of the blade 22 through the shaving zone defined by the blade support platform 24. Below the blade support platform is formed a guard structure 68 that includes a guard surface 70 at its forward end. This guard structure is secured to the blade support platform by a web hinge element 72 which is secured to the blade support platform at the front edge 74 of that platform. This hinge web 72 in the illustrated embodiment is an imperforate web 0.005 inch in depth which is reinforced with rib elements 76, each of which has a depth of 0.015 inch and a width of 0.030 inch, and which are spaced 0.060 inch apart. Slots 78 are provided in the guard member between guard surface 70 and front edge 74 to permit movement of hair elements or other debris that might accumulate during the shaving operation away from the shaving zone. Extending rearwardly from hinge web 72 and integral therewith is an adjusting lever element 80 in the form of a flat elongated member that has a stud 82 projecting from its rear surface.

The cover 16 is secured to the back 14 such that its upper surface 90 is substantially aligned with the front edge 74 of shaving platform 24 and in firm continuous engagement with a lower surface portion of the guard structure and a seal between the cover and the back elements is provided at that point which prevents debris from entering the interior of the magazine and the blade storage compartments. Dowel pins 92 extend rearwardly from the inside surface of the inside wall of cover 16 and are received in holes 94 in the back element 14. The cooperation of these dowel pins 92 within holes 94 assists the proper registration and position of the cover 16 on the base element 18 and contributes to securing these elements together to form the complete magazine 12.

The holder 10 has formed at its upper end a head portion 100 having a forwardly projecting elongated lip 102 and a downwardly extending supporting web 104 rigidly connected at its lower end to handle 106. The lip 102 on head 100 is provided with slots 108 which receive in mating relation the blade guide tabs 62 on the upper side of the magazine. Lip 102 extends over the entire width of the head and has a substantially flat blade engaging land surface 110 on its under side. As best shown in FIGS. 8 and 9 when magazine 12 is secured in holder 10 this land surface 110 engages and urges blade 22 downwardly into contact with the blade supporting platform 24 so as to firmly clamp the exposed shaving portion of the blade against the supporting surface in flat shaving position.

A blade advancing lever 120 is rotatably journaled in opening 122 of web 104. This blade advancing lever has secured to it a locating pin 124, the forward end of which is frictionally received in bore 126 of arbor 28, and a driving pawl 128 which engages with a lug on the arbor when the magazine is mounted in the holder so that, when the blade advancing lever 120 is rotated, the arbor is turned to advance a fresh portion of blade 22 into shaving position.

A latch structure 130 is pivotally mounted on the holder immediately below the holder recess that receives magazine 12. When the magazine 12 is mounted in the holder 10, as indicated in FIG. 2, the latch structure 130 biases the magazine upwardly towards lip 102 to clamp the length of the blade 22 in the shaving zone against the blade support platform 24. When the thumb piece of the latch structure 130 is pressed inwardly a rear cam surface of the latch structure acts against the bottom of the magazine to release the magazine 12 and permit it to be removed from the holder 10.

As best seen in FIG. 7, there is provided in the magazine base 18 an aperture 150 that is disposed concentrically with the cylindrical supply chamber defined by wall 20. This aperture 150 has a series of nine positioning notches 152 spaced about its periphery. A camming element 160 of configuration best shown in FIGS. 5 and 6 is disposed in aperture 150. This camming element has disc portion 162 and a boss portion 164 with a rib 166 extending about the periphery of the boss for engagement with the wall of aperture 150 as indicated in FIG. 2 so that the camming element is secured for rotation in aperture 150. Formed integrally with boss 164 is a T-shaped latch structure having a thin, resilient transverse web 170 extending across the diameter of the boss and a laterally extending latch leg 172 that projects through gap 174 in the wall of boss 164 and has a depending foot portion 176 which extends downwardly from the boss through the plane of the disc portion 162. The cam disc 162 carries on its upper surface as viewed in FIG. 6 a helical cam groove 180, 0.040 inch in depth. This cam groove 180 rises from a radius at end 182 of 0.3185 inch to a radius at end 184 of 0.4040 inch, a rise of 0.0107 inch for each 39° increment of adjustment. This camming element is snapped onto back 14 so that boss 164 is disposed in aperture 150 with ridge 166 protruding through aperture 150 and the tip of latch leg 172 disposed in a notch 152. When so positioned, stud 82 of the adjusting lever portion 80 of the guard structure is disposed in groove 180. The periphery of the disc portion 162 is provided with serrations 186 which facilitate the manual rotation of the cam disc and consequent adjustment of the shaving geometry, that is position of the guard surface 70 relative to blade edge 50.

On the reverse surface of disc 162 from the grooved surface there is provided a sequence of numbers 190 which provide an indication of the position of groove 180 with respect to lever 80. When the magazine 12 is positioned in holder 10 (as indicated in FIG. 1) a number 190 is visible through aperture 192 and provides an indication of the adjusted position of guard 70.

Several distinct relationships are useful in evaluating shaving geometry. With reference to FIG. 8, a line 200 may be drawn tangent the outer surface of lip 102 and the guard surface 70. The distance D that the sharpened edge 50 of the blade 22 projects in a direction perpendicular to line 200 may be termed "exposure." Another concept useful in defining shaving geometry is the tangent angle A between line 202 (the plane of blade 22) and line 204 (a line tangent to the surface of guard 70 and the sharpened edge 50 of blade 22). A further dimension of the razor structure that may be varied to have a significant effect on the comfort and/or effectiveness of shaving is the distance S (termed herein "span") between the sharpened edge 50 of blade 22 and the tangent point of the guard 70 as indicated by lines 206 and 208, respectively.

The structure of the invention moves the guard surface 70 relative to the sharpened edge 50 of the blade about an axis (approximately at point 210) located in the hinge web 72 substantially in alignment with the front edge 74 of the blade support platform. Through movement of lever 80 in response to the adjusting member 160, the tip of guard surface 70 is caused to move generally along the path 212.

In the embodiment illustrated in FIGS. 1–9 a normal value of tangent angle (with stud 82 engaged in the midpoint of groove 180) of 31° is provided. The "exposure" in this position is about 0.0034 inch and the "span" is about 0.062 inch. Through adjustment to the position shown in FIG. 9 the tangent angle is increased 6° to 37° while increasing the "exposure" to about 0.0062 inch and the "span" to about 0.675 inch. When the tangent angle is decreased to 22° 33′ a negative "exposure" of −0.0014 inch results and "span" decreases to 0.0541 inch. In the illustrated structure the rate of change of the ratio of span to tangent angle increases as the tangent angle decreases. Thus, with reduced span and reduced exposure, a safer shave is available at small tangent angles.

With reference to FIGS. 10 and 11 the safety razor there illustrated includes a holder member 10' of the type shown in the Nissen Patent No. 3,262,198. This holder includes a head portion 100' having a forwardly projecting elongated lip 102' and a downwardly extending supporting web 104' rigidly connected at its lower end to handle 106'. Secured to web 104' is an elongated magazine guiding strip 300 which guides the cartridge (magazine) 12' into proper position so that lip 102' engages the blade 22' supported on shaving platform 24' so as to firmly clamp the exposed shaving portion of the blade against the supporting surface in flat shaving position. Blade advancing lever 120' is arranged to drive the arbor 28' for advancing a fresh portion of blade 22' into shaving position when the magazine 12' is secured in holder 10' by latch structure 130'.

The magazine 12' is of similar construction to the magazine shown in FIGS. 2–4 including the hinged guard surface 70' forwardly of blade platform 24' but incorporates a modified form of shaving geometry adjustment mechanism which employs actuator 310 and follower plate 312 as a substitute for cam disc 160. In this embodiment, as indicated in FIGS. 11–13, the back 14' is recessed to receive plate 312 and two rearwardly extending pins 314, 316 are formed on the rear of actuating lever 80', which pins are disposed on either side of recess 318 which accommodates positioning member 300 when magazine 12' is latched in holder 10'. The aperture 150' in the base of the supply chamber 20' is circular in configuration and functions as a bearing surface for surface 320 (FIG. 18) of actuator lever 310 manufactured of an acetyl plastic sold under the name Delrin.

Figure 17:
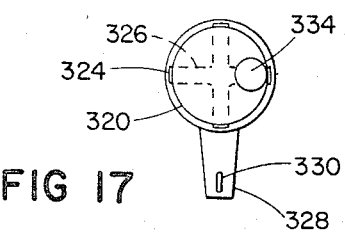
FIGS. 17–19 are rear, side and front views, respectively, of the adjusting member employed in the magazine shown in FIGS. 10–12.
Figure 18:
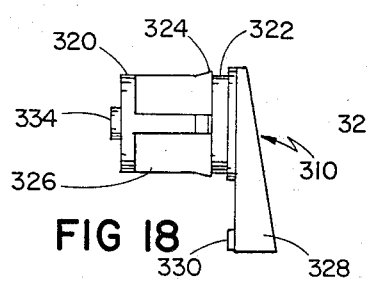
Figure 19:
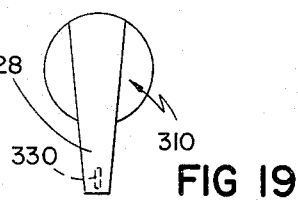

That actuator lever (as indicated in FIG. 18) has a second bearing surface 322 which is received in a circular aperture in cover 16' and the lever is secured in position on the cover by latch projections 324 immediately behind surface 322. The body of the actuator lever between these two bearing surfaces is of cruciform configuration for molding convenience as indicated in FIG. 17. Handle 328 has a projection 330 on its rearward surface which engages one of the series of recesses 332 (FIG. 10) in the cover to perform a similar indexing function as do notches 152 in the embodiment shown in FIGS. 1–7. On the rear surface of the actuator member 310 is mounted a circular cam element 334, 0.140 inch in diameter, the center of which is offset 0.090 inch from the center of bearing surface 320 which is 0.315 inch in diameter.

Figure 15:
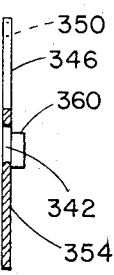
Figure 16:
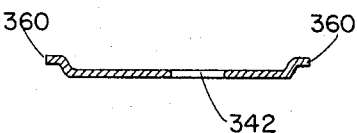

Guide plate 312 (as indicated in FIGS. 14–16) has a body portion 340 with an aperture 342 of generally rectangular configuration which receives cam 334. The guide plate is manufactured of suitable metal or plastic material and when sheet metal is used it is preferred that the edges of aperture 342 be smoothed or rounded as indicated in FIG. 15 to provide a smooth surface for engaging cam disc 334. Guide plate 312 has two legs 346, 348 which extend upwardly from body 340 and each of which has an aperture 350, 352 which frictionally receives projecting pins 314, 316, respectively. It is also preferred that the guide plate have a downwardly extending portion 354 to balance stresses imposed during movement of the guide plate to adjust shaving geometry. A guide projection 356 having parallel surfaces which are positioned within the recess extension 358 in the back may be employed for supplemental vertical guidance of the plate during its movement. A tab 360 extends laterally from either side of the guide plate body and each is offset forwardly, as indicated in FIG. 16, so that it is secured beneath lip 362 of cover 16' (which lip also engages recess surface 364 for securing the cover 16' to the back 14') when the cover and back are assembled as indicated in FIG. 12. These tabs and lips thus cooperate to secure the guide plate 312 to the magazine assembly while permitting its vertical motion relative to that assembly.

This configuration of magazine adjustment structure provides ±0.060 vertical motion of the guide plate in response to rotation of actuating lever 310 of 45° in either direction. This motion of the plate 312 produces corresponding motion of adjusting lever portion 80' to produce substantially the same range of adjustment as that described above in connection with FIGS. 8 and 9.

Figure 20:
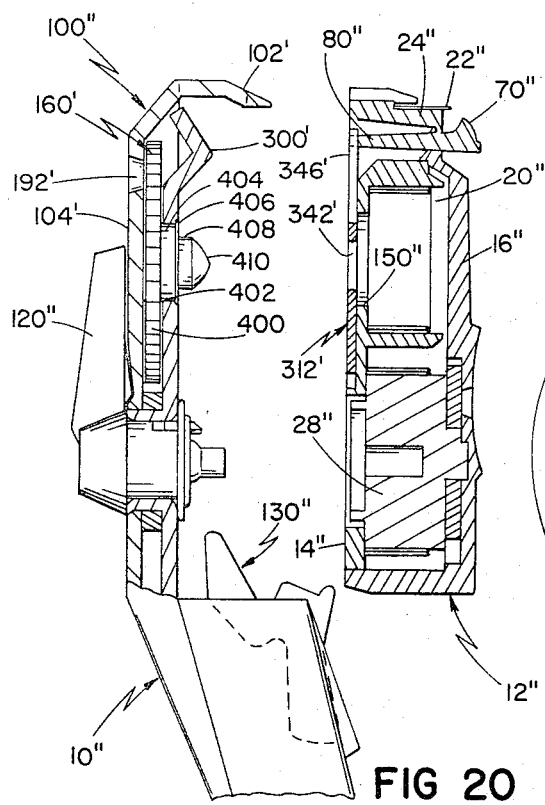
FIG. 20 is a side sectional view of still another form of holder and magazine (in spaced relation) constructed in accordance with the invention.
Figure 21:
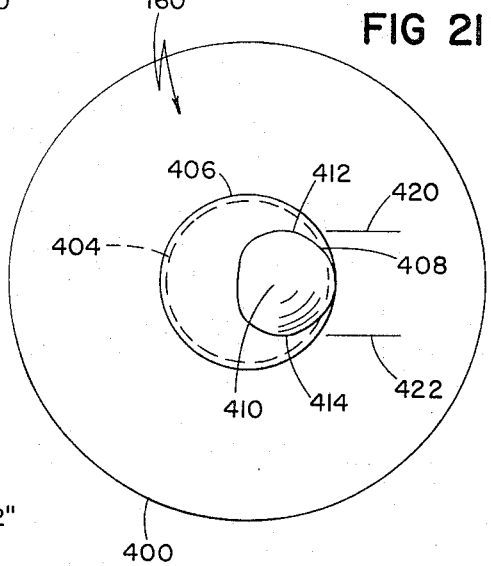
FIG. 21 is a plan view of the actuator employed in the embodiment shown in FIG. 20.

Still another embodiment of the invention is shown in FIGS. 20 and 21. This embodiment allows the adjusting structure to be mounted in the holder 10" while accommodating the range of shaving geometry adjustments permitted by either of the previously described embodiments. In this embodiment an actuator member 400 is secured between the holder head 100" and magazine locating element 300'. Element 300' has a circular aperture 402 in which is disposed bearing surface 404 of actuator member 400. Surface 404 has an enlarged bead 406 which cooperates with aperture 402 to secure the actuator to element 300'. Actuator 400 further includes a cam surface 408 and an entrance guide surface 410. The magazine 12" has a guide plate 312' of configuration similar to that of the guide plate shown in FIGS. 14–16 with aperture 342' overlying the aperture 150" in the base of supply chamber 20".

The configuration of cam surface 408 may be seen with reference to FIG. 21. The working portions of surface 408 are two opposed segments 412, 414, each 120° in angular length. Segment 412 engages aperture surface 420 and segment 414 engages aperture surface 422. This cam surface is received between parallel sides 420, 422 of aperture 342' and provides vertical motion of plate 312' as a linear function of rotation of actuator 400 over a range of 120° (±60°) with segments 412, 414 remaining in engagement with surfaces 420, 422 respectively throughout this range. (Aperture 192' in head 100" permits a mark on disc 400 indicative of the geometry setting to be viewed by the user of the razor.) The tapered entrance surface 410 of the actuator member 400 accommodates the plate aperture 342' and repositions that plate in accordance with the setting of the disc as the magazine 12" is inserted into holder 10". Thus a shaving geometry setting may be fixed for a particular holder 10" and the blade magazine 12" is automatically placed in that shaving geometry configuration as it is inserted into the holder.

A specific form of cartridge construction employing a cam of the type shown in FIGS. 20–21 mounted in the magazine is shown in FIGS. 22–34. This cartridge is adapted to be secured in a holder member of the type shown in the Nissen Patent No. 3,262,198 as described above. The cartridge is of similar construction to the magazine shown in FIGS. 2–4 and includes a guard surface disposed in front of a blade platform and incorporates a type of shaving geometry adjustment mechanism similar to that shown and described in conjunction with FIGS. 10–21. As shown in FIGS. 22–24, the cartridge includes a blade support platform 500 on which is disposed a length of ribbon type blade 502 which is received from a supply cavity 506 over radiused platform end 508, and after use is fed over radiused platform end 510 to take up arbor 512 that is engaged for rotation by a take up lever mounted on the cartridge holder.

An adjusting lever 520 is mounted on the front of the cartridge and has a handle portion 522 which is movable through five positions as indicated by detent grooves 524 molded on the front face of the cartridge. Below this adjusting lever is an aperture 526 behind which is mounted indicator disc 528 which is advanced as the arbor 512 is rotated to indicate the number of lengths of shaving blade remaining for use.

On the back member 556 of the cartridge is formed a recess 530 in which is disposed a guide plate 532. This guide plate has a main body portion in which is disposed an aperture 534; a depending foot 536 having parallel side walls 538; and two upstanding arms 540, each of which has an aperture 542 in its upper end in which is received a projecting pin 544 of the shaving geometry mechanism of configuration as described above. This mechanism includes a guard for surface 550 which is disposed forwardly and downwardly of the blade support platform 550 and secured to that platform by hinge web 552. Rearwardly extending rigid bar 554 has the two pins 544 protruding from its rear surface. This structure is molded integrally with the back member 556 of the cartridge as indicated in FIGS. 27 and 28.

The front member 560 of the cartridge includes at its upper end a support member 564 which is aligned with and assists the accuracy of definition of the hinge axis as established by web 552 when the back and front members are assembled together. The front member also includes tab portions 566, 568 which engage recesses 570, 572, respectively in the back member 556; and guide pins 574 which are received in apertures 576 in the back member. These components may be molded of a suitable organic material such as an acetyl resin, a polyphenyleneoxide resin or an ABS polymer. While slide plate 532 could be manufactured of such materials it is made of aluminum in the described embodiment.

Details of the configuration of the cartridge front member 560 may be seen with reference to FIGS. 25 and 26; of the cartridge back member 556 with reference to FIGS. 27 and 28; of the cartridge slide plate 532 with reference to FIGS. 29 and 30; and of the actuating lever 520 with reference to FIGS. 31–34.

With reference to FIGS. 29 and 30, aperture 534 in plate 532 includes a right hand curved section 600 of 0.135 inch radius in the specific embodiment; a left hand curved section 602 of 0.101 radius; and two straight horizontal connecting surfaces 604 and two aligned vertical surfaces 605 that connect the two curved end sections 600, 602. The distance between surfaces 604 is 0.203 inch in this embodiment. The lower edges of surfaces 602 and 604 is a smooth radius of 0.005 inch as indicated by dotted line 606. Each aperture 542 in arms 540 is in an offset portion 610 and is formed by sequential embossing and punching steps to provide the offset which increases the engagement of apertures 542 with pins 544. In this embodiment this offset is 0.020 inch and each aperture 542 has a 0.040 inch diameter.

The adjusting lever 520 is shown in FIGS. 31–34. This component has a handle portion 522 on the rear surface of which is formed a ridge 620 adapted to engage the series of grooves 524 in the face of the cartridge for locking the adjusting lever in a particular adjusted position. The adjusting lever includes a first cylindrical portion 622 which is received in aperture 626 in cover 560 (FIG. 25). Aperture 626 has two inwardly projecting tabs 624 which cooperate with lands 625 (FIG. 33) formed behind cylinder 622 to limit rotation of lever 520. A second cylindrical portion 628 (which is received in journalled relation in aperture 630 in the back member 556 (FIG. 27)) is connected to portion 622 by web 632 which thus has unsymmetrical flexibility. Portion 622 is molded at an angle of 4° with respect to the axis of portion 628. Both cylindrical portions 622, 628 have tapered surfaces 633 at their edges to facilitate entrance into apertures 626 and 630, respectively.

Formed to the rear of portion 628 is a cam surface 640 of configuration as indicated in FIG. 34. This cam surface has two opposed cam surfaces 642, 644 each of which is composed of two arcs 646, 648. These arcs have centers 650 which are offset from the horizontal center line 652 a distance of 0.023 inch, and from vertical center line 654 a distance of 0.035 inch. Each segment 646 of the cam surfaces 642, 644 has a radius 656 of 0.77 inch from the closer center 650 while each segment 648 has a radius 658 of 0.123 inch from the more remote center 650.

At the end of the adjusting lever is a latching structure 660 of configuration as indicated in FIGS. 32–34. The latching structure 660 includes a relatively large radiused section 662 at its right end as viewed in FIG. 33 and a smaller radiused section 664 on its left end. These surfaces are connected by transition surfaces 666. Surfaces 664 and 666 are inclined at 45° angles. The under surface of section 662 forms a latching surface.

In assembly, after the blade 502 has been positioned in the back component 556, cover component 560 is placed in juxtaposed position as indicated in FIGS. 22–24 and latched by the engagement of tabs 566 and 568 with surfaces of back 556. The adjusting lever 520 is inserted from the front of the cartridge through apertures 626 and 630; aperture 630 firmly journalling cylindrical bearing 628. Plate 532 is then positioned in the recess 530 on the back 556 with the pins 544 disposed in the apertures 542 in the upstanding arms 540. Plate 532 is restrained for rotation about an axis defined by the pins 544 as it engages the fixed inclined camming surfaces 664 and 666 of latch portion 660 and is forced by those surfaces to the left as viewed in FIG. 23. The plate 532 snaps into the recess 530 where it is restrained by the vertical side walls that engage edges 538, and by the latching under surface of section 662 of the adjusting lever. The adjusting lever 520 is flexed as permitted by the coupling section 632 in this assembly operation so that the axes of section 622 and 628 are substantially aligned. The adjusting lever thus secures the components of the cartridge together as plate 632 is restrained by engagement of depending foot 536 with the vertical side walls of recess 530; by engagement of pins 544 with apertures 542; and by the engagement of the lever 520 with the plate.

The effective angular length of cam surfaces 642 and 644 are each 120°. These cam surfaces engage parallel surfaces 604 of slide plate 532 and rotation of adjusting lever 520 provides vertical motion of that slide plate as a linear function of rotation over a range of 120° (±60°) with cam surfaces 642, 644 remaining in engagement with aperture surfaces 604 throughout this range of rotation; and with web 632 flexing to allow release of detent 620 from grooves 524.

This configuration of magazine adjustment structure provides ±0.046 inch of vertical motion of the slide plate in response to the rotation of the actuator lever of 60° in either direction. This motion of the slide plate produces corresponding motion of the bar portion 554 to produce substantially the same range of adjustment as that described above in connection with FIGS. 8 and 9.

Thus it will be seen that the invention provides a compact reliable arrangement for adjusting shaving geometry which permits a wide range of shaving geometries in coordinated relation to be achieved with ease and precision. The arrangement is compatible for manufacture by high volume production techniques employing plastic materials.

While particular embodiments of the invention have been shown and described, various modifications thereof will be apparent to those skilled in the art. As an example, it will be apparent that other forms of adjusting members may be utilized such as a lateral planar type cam having straight line motion or a screw thread type cam rotatable about an axis which is perpendicular to the hinge axis and substantially parallel to the back member. Still other modifications will be apparent to those skilled in the art. Therefore it is not intended that the invention be limited to the disclosed embodiments or to details thereof and departures may be made therefrom within the spirit and scope of the invention as defined in the claims.

What is claimed is:

1. In a safety razor, a blade support platform which defines a shaving zone for receiving a shaving length of blade in supporting position with the sharpened edge of the blade projecting beyond the front edge of said support platform, a blade guard structure extending in generally parallel spaced relation to and disposed forwardly of the front edge of said blade support platform, a hinge securing said guard structure to said platform, said hinge being a web element formed integrally with said guard structure and defining an axis parallel to said guard structure, and an adjusting portion extending beneath said blade support platform for cooperation with adjusting means mounted on said razor to move said guard structure relative to said blade support platform about said hinge axis for adjusting the shaving geometry of said razor.

2. The structure as claimed in claim 1 and further including a series of spaced reinforcing ribs formed integrally with said web.

3. The structure as claimed in claim 2 wherein said web is imperforate.

4. The structure as claimed in claim 1 wherein said axis is disposed substantially in alignment with the front edge of said support platform.

5. The structure as claimed in claim 1 wherein said adjusting means is rotatably mounted and actuates a camming surface for engaging said guard adjusting portion.

6. The structure as claimed in claim 5 and further including latch means for locking said adjusting device in a series of positions to provide a sequence of different shaving geometrics.

7. For use in a safety razor, a magazine member adapted to be received in a holder member, said magazine member adapted to store a ribbon-like blade of uniform width having a longitudinally extending rear edge and a parallel sharpened front edge, said magazine member comprising structure defining a blade supply position, a blade take-up position and a blade path extending between said supply position and said take-up position, said structure defining said blade path including a blade support platform which defines a shaving zone for receiving a shaving length of blade in supporting position with the sharpened edge of the blade projecting beyond the front edge of said support platform, a blade guard structure extending in generally parallel spaced relation to and disposed forwardly of the front edge of said blade support platform, a hinge securing said guard structure to said platform, said hinge being a web element formed integrally with said guard structure and defining an axis parallel to said guard structure, said blade guard structure including an adjusting portion extending beneath said blade support platform for cooperation with adjusting means mounted on one of said members to move said guard structure relative to said blade support platform about said hinge axis for adjusting the shaving geometry of said razor, and blade take-up mechanism coupled to said take-up position for advancing a blade stored in said magazine member to position a sequence of shaving portions of said blade on said blade support platform.

8. The magazine member as claimed in claim 7 and further including a series of spaced reinforcing ribs formed integrally with said web.

9. The magazine member as claimed in claim 8 wherein said web is imperforate.

10. The magazine member as claimed in claim 7 wherein said axis is disposed substantially in alignment with the front edge of said support platform.

11. The magazine member as claimed in claim 7 wherein said adjusting means is rotatably mounted and actuates a cam member engaging said guard adjusting portion.

12. The magazine member as claimed in claim 11 and further including latch means for locking said adjusting means in a series of positions to provide a sequence of different shaving geometries.

13. The magazine member as claimed in claim 12 wherein said magazine includes a back component and a cover component and said structure defining said supply position, said take-up position and said blade platform are all formed on said back component.

14. The magazine member as claimed in claim 13 wherein said magazine components are of molded organic plastic material.

15. The magazine member as claimed in claim 7 wherein said adjusting means includes a guide plate mounted on said magazine member for sliding movement in engagement with said adjusting portion of said blade guard structure, said guide plate having an aperture therein, and a camming member rotatably mounted on said magazine member, said camming member having a cam surface disposed in the aperture of said guide plate for moving said guide plate to adjust the shaving geometry of said razor.

16. The magazine member as claimed in claim 15 wherein said guide plate is secured to said adjusting portion at a plurality of points.

17. The magazine member as claimed in claim 15 wherein said guide plate includes control structure cooperating with said magazine member for producing straight line motion of said guide plate in response to rotation of said camming member.

18. The magazine member as claimed in claim 15 wherein said cam surface is offset from the axis of rotation of said camming member.

19. The magazine member as claimed in claim 18 wherein said cam surface includes two arcuate segments of a first radius and two arcuate segments of a second radius.

20. The magazine member as claimed in claim 15 wherein said camming member further includes a latching surface engaging said guide plate for securing said guide plate on said magazine member.

21. For use in a safety razor, a magazine member adapted to be received in a holder member, said magazine member adapted to store a ribbon-like blade of uniform width having a longitudinally extending rear edge and a parallel sharpened front edge, said magazine member comprising structure defining a blade supply position, a blade take-up position and a blade path extending between said supply position and said take-up position, said structure defining said blade path including a blade support platform which defines a shaving zone for receiving a shaving length of blade in supporting position with the sharpened edge of the blade projecting beyond the front edge of said support platform, a blade guard structure extending in generally parallel spaced relation to and disposed forwardly of the front edge of said blade support platform, said blade guard structure being mounted on said magazine member for movement relative to said blade support platform for adjusting the shaving geometry of the razor, adjusting means cooperating with said blade guard structure for moving said guard structure relative to said blade support platform comprising a cam follower member coupled to said blade guard structure and mounted on said magazine member for sliding movement relative thereto, a camming member engaging said cam follower member to adjust the position of said blade guard structure, and structure for indicating the position of said camming member to provide an indication of the shaving geometry setting of the razor, and blade take-up mechanism coupled to said take-up position for advancing a blade stored in said magazine member to position a sequence of shaving portions of said blade on said blade support platform.

22. The magazine member as claimed in claim 21 wherein said camming member includes a cam surface engaging said cam follower member and a handle portion on the front of said magazine for manual manipulation of said camming member to adjust the shaving geometry setting of the razor.

23. The magazine member as claimed in claim 21 wherein said camming member extends through said blade supply position and includes first and second cylindrical bearing surfaces which cooperate with the front and back walls of said magazine member to define the axis of rotation of said camming member, and a coupling portion of smaller cross-section than either of said bearing surfaces connected between said bearing surfaces.

24. The magazine member as claimed in claim 21 wherein said cam follower member is a guide plate and said camming member further includes at one end a latching surface engaging said guide plate for securing said guide plate on said magazine member and a handle portion at its other end for rotating said camming member.

25. The magazine member as claimed in claim 24 wherein said guide plate has an aperture that includes two parallel cam follower surfaces, a first arcuate section joining the one end of said two cam follower surfaces and a second arcuate section joining the other end of said two cam follower surfaces.

26. The magazine member as claimed in claim 25 wherein said camming member is rotatably mounted on said magazine and includes a cam surface that is offset from the axis of rotation of said camming member, said cam surface including two arcuate segments of a first radius and two arcuate segments of a second radius.

27. The magazine member as claimed in claim 26 wherein said guide plate is secured to said adjusting portion at a plurality of points, and includes control structure cooperating with said magazine member for producing straight line motion of said guide plate in response to rotation of said camming member.

28. For use in a safety razor, a magazine member adapted to be received in a holder member, said magazine member adapted to store a ribbon-like blade of uniform width having a longitudinally extending rear edge and a parallel sharpened front edge, said magazine member comprising structure defining a blade supply position, a blade take-up position and a blade path extending between said supply position and said take-up position, said structure defining said blade path including a blade support platform which defines a shaving zone for receiving a shaving length of blade in supporting position with the sharpened edge of the blade projecting beyond the front edge of said support platform, a blade guard structure extending in generally parallel spaced relation to and disposed forwardly of the front edge of said blade support platform, a hinge securing said guard structure to said platform, said hinge defining an axis parallel to said guard structure, and substantially in alignment with the front edge of said support platform, said blade guard structure including an adjusting portion extending beneath said blade support platform for cooperation with adjusting means mounted on one of said members to move said guard structure relative to said blade support platform about said hinge axis for adjusting the shaving geometry of said razor, and blade take-up mechanism coupled to said take-up position for advancing a blade stored in said magazine member to position a sequence of shaving portions of said blade on said blade support platform.

29. The magazine member as claimed in claim 28 wherein said hinge is an imperforate web element formed integrally with said guard structure and said blade support platform, said hinge axis being located in said web.

References Cited
UNITED STATES PATENTS

| | | | |
|---|---|---|---|
| 1,308,801 | 7/1919 | Mergenthaler | 30—40.1 |
| 3,128,551 | 4/1964 | Crown | 30—63 |
| 3,203,093 | 8/1965 | Kuhnl | 30—63 |
| 3,262,198 | 7/1966 | Nissen | 30—40.1 |

MILTON S. MEHR, *Primary Examiner.*